April 18, 1967 S. E. HAGGARD 3,314,174
UNDERWATER MINING APPARATUS AND METHOD
Filed Dec. 31, 1963 2 Sheets-Sheet 1
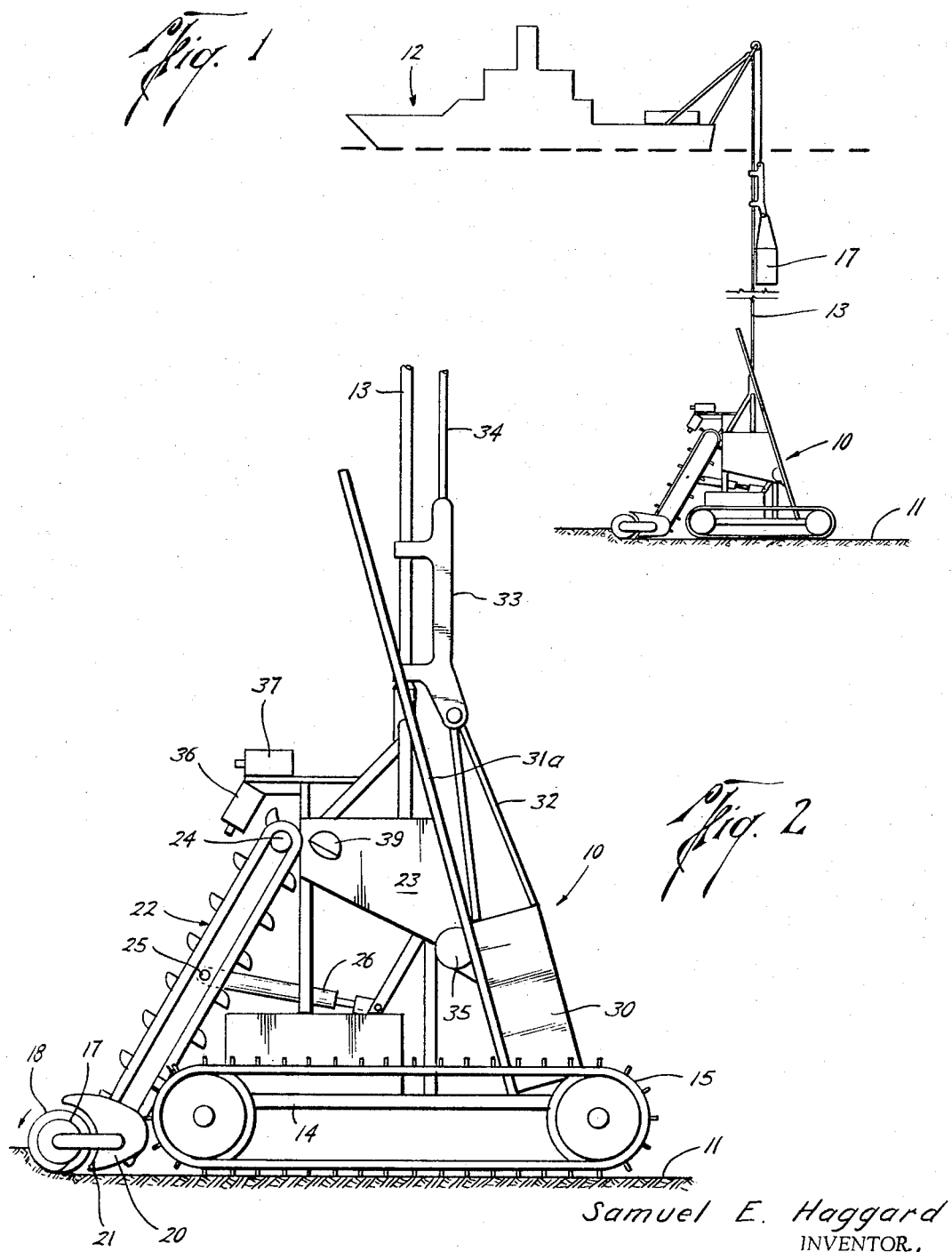
Samuel E. Haggard
INVENTOR.
BY
ATTORNEYS April 18, 1967  S. E. HAGGARD  3,314,174
UNDERWATER MINING APPARATUS AND METHOD
Filed Dec. 31, 1963  2 Sheets-Sheet 2
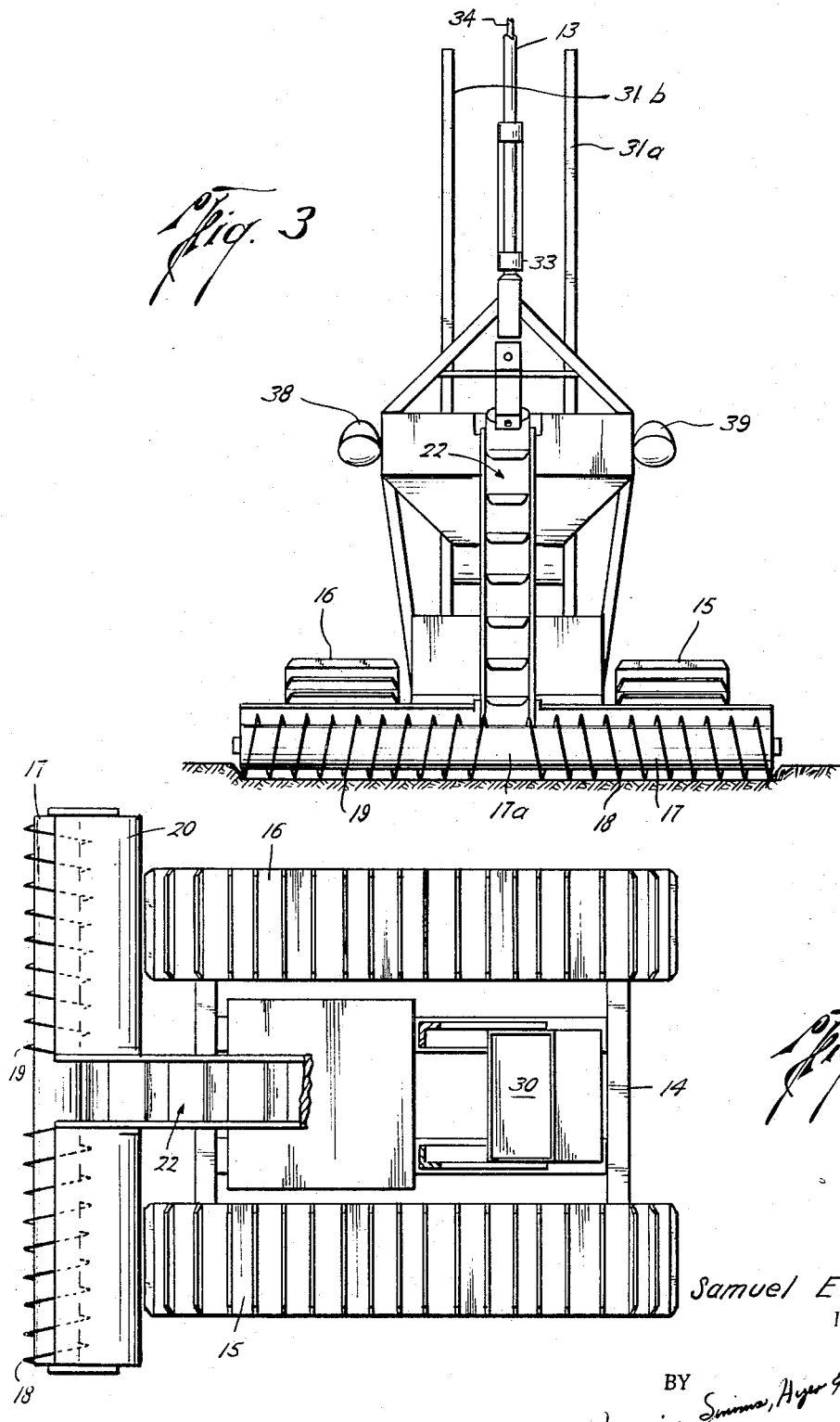
Samuel E. Haggard
INVENTOR.
BY
ATTORNEYS United States Patent Office 3,314,174
Patented Apr. 18, 1967

3,314,174
UNDERWATER MINING APPARATUS
AND METHOD
Samuel E. Haggard, 2924 Quenby Road,
Houston, Tex. 77005
Filed Dec. 31, 1963, Ser. No. 334,810
5 Claims. (Cl. 37—54)

This invention relates to underwater mining generally, and in particular, to a method of, and apparatus for, mining the bottom of a body of water.

It is apparent from the evidence, which has been collected over the years, that the ocean floor is rich in minerals of many kinds. In many instances, the minerals are on, or close to, the surface of the bottom. For example, there is reliable evidence indicating that certain areas of the ocean floor are very densely covered by nodules which are principally made up of manganese, but which also contain nickel and cobalt. Nodules of phosphorite have also been found in large quantities in certain areas.

These nodules alone, if they could be recovered economically, would provide a source for these metals which has been estimated as containing around 200 billion tons of ore.

In addition to the nodules, the ocean floor has concentrations of other valuable material. The continental shelves are rich in a variety of minerals, including tin, iron, phosphorite, sulfur, etc. Beyond the continental shelves is a layer of fine-grained red clay containing about 50% silica, 20% aluminum oxide, and substantial amounts of manganese, cobalt, copper, nickel and vanadium.

At the present time, diamonds are being mined from the ocean floor off the west coast of South Africa and iron ore is being recovered from the bottom of Ariake Bay in Japan. The diamonds are being mined by a modified hydraulic dredging operation which uses air jets to break away the bottom material and lift it to the surface through a conduit. The iron ore is also being mined with hydraulic dredging type of equipment. Both of these mining operations are in relatively shallow water. The diamond operation off South Africa, for example, is in water which averages about 100 feet in depth.

Most of the areas located to date, where the nodules described above occur in sufficient densities to make a mining operation economically feasible, are in water ranging from 2,000–5,000 feet deep with many being located in much deeper water. Thus, there is a need for an underwater method and apparatus which can be operated at such depths and it is an object of this invention to provide such a method and apparatus.

It is another object of this invention to provide an underwater mining method and apparatus which can be operated at the bottom of very deep bodies of water without requiring the presence of a human operator at the equipment, but which can be controlled from the surface of the water.

It is also an object of this invention to provide a method of, and apparatus for, mining the bottom of a body of water whose efficiency of recovery is unaffected by the depth of the water.

It is another object of this invention to provide a method of, and apparatus for, mining the bottom of a body of water which mines the bottom in strips of a given width, thereby allowing the bottom to be systematically covered to insure the maximum recovery from the area being mined.

It is another object of this invention to provide a method of, and apparatus for, mining the bottom of a body of water in which the material mined is transferred to the surface in batches without interrupting the operation of digging the material from the bottom which can continue continuously.

It is another object of this invention to provide a method of, and apparatus for, mining the bottom of a body of water which removes a layer of material from the bottom of uniform thickness.

It is another object of this invention to provide a method of, and apparatus for, mining the bottom of a body of water which reduces the volume of material which is transferred to the surface by separating from the material mined at least a portion of its undesired components before it is transferred to the surface.

These and other objects are obtained in accordance with this invention by digging away a layer of material from the bottom of a body of water, collecting the material together, and transferring the material collected in batches to the surface of the water. To accomplish this, means are provided which move along the bottom and supports the digging means and the collecting means. Thus, as opposed to mining methods and apparatus heretofore employed, the apparatus for the digging and collecting of the material operates with generally the same efficiency and with the same power all other things being equal, regardless of the depth of the water above the bottom being mined. The depth of the water will, of course, affect the power required to transfer the material mined to the surface, however, by collecting the mined material together prior to its being transferred to the surface, in some instances, means can be provided to remove at least a part of the unwanted portion of the material collected prior to its being transferred to the surface.

Means are also provided to supply power to the device located on the bottom, to connect or tether the device to a surface vessel and to also guide the material transferring means from the surface of the water back to the device.

An embodiment of the invention will now be described in detail, in connection with the attached drawings, in which:

FIG. 1 is a view in elevation illustrating apparatus embodying the invention in position mining the bottom of a body of water; the power transmitting means, tethering means and guide means for the material transferring means being combined into one flexible cable, and with the material transferring means being shown part way between the surface vessel and the material digging and collecting vehicle;

FIG. 2 is a side elevational view of the digging and collecting apparatus of FIG. 1 shown in enlarged scale;

FIG. 3 is a view in front elevation of the apparatus of FIG. 2; and

FIG. 4 is a top view partly in section of the apparatus of FIG. 2.

The apparatus of this invention, as stated above, includes means for digging and collecting material from the bottom and means for transferring this material to the surface.

In the embodiment illustrated, the digging and collecting means are carried by a mobile unit or vehicle generally indicated by the number 10, which, as shown in FIG. 1, rests on bottom 11 of a body of water and is connected to a surface vessel, generally indicated by the number 12, by cable 13. The material transferring means includes container 17, which is shown either on its way to the surface with a load of material which has been mined or is part way through its return trip to the vehicle to pick up another load of material.

In the preferred embodiment of this invention, vehicle 10 is arranged to move itself along the bottom with power transmitted to it from the surface. Under favorable circumstances the vehicle could possibly be moved in some other fashion.

Vehicle 10 comprises a structural framework, generally indicated by the number 14, which is movably supported by track assemblies 15 and 16. Other means for supporting and driving the vehicle could, of course, be used, conditioned to handle the load and to operate on a soft formation.

Any well-known method can be employed to drive the tracks, such as electric or hydraulic motors, and preferably, each track is driven independently so that the direction of the vehicle can be controlled by alternately stopping and starting the tracks on opposite sides of the vehicle. For this purpose a braking system should also be provided so that one track can be held while the other rotated to turn the vehicle in one direction or the other. Power for driving the tracks to move the vehicle is supplied from the surface vessel through cable 13.

As vehicle 10 moves along the bottom, means are provided for digging away a strip of the top layer of material along the path traveled by the vehicle and for collecting this material for transferral to the surface. In the embodiment illustrated, to dig away the top layer of material from the bottom, a disc-type plow is employed which comprises, cylindrical member 17, rotatably mounted across the front of the vehicle and provided with helical vanes 18 and 19 which extend perpendicularly from the cylinder. The cylinder is mounted to rotate around an axis parallel to the bottom and extending laterally of the direction of travel of the vehicle. Also, as best seen in FIG. 3, vanes 18 and 19 spiral around cylindrical member 17 in opposite directions. In this way, the vanes will not only engage the bottom of the body of water being mined and tear away its upper layer in the manner of a disc plow, but, as will be explained below, also assist in collecting the material for transfer to the surface. To improve the digging efficiency of the vanes, power means are provided (not shown) to rotate cylinder 17.

After material has been dug away from the bottom, means are provided for collecting the material preparatory to its being transferred to the surface. As stated above, in the embodiment illustrated, helical vanes 18 and 19 assist in the collection of the material mined. Thus, by arranging the vanes to spiral in opposite direction as shown in FIG. 3, and by rotating cylinder 17 in counterclockwise direction, as viewed in FIG. 2, the vanes will tend to move the material it digs or plows from the bottom laterally toward the center section 17a of the cylinder. To collect and contain the material dug by the vanes so that they can also move it laterally, retaining member 20 is positioned directly behind the vanes and provided with a concave surface 21, whose lower edge scoops up the material dug from the bottom and holds it in position to be moved laterally by the rotating vanes. Vanes 18 and 19 and convex surface 21 in effect serve to "windrow" the material which the vanes dig from the bottom. The windrow could, of course, be formed along any line parallel to the direction of travel of the vehicle. The center line is advantageous in that it requires the material to be moved the shortest distance.

As the material is brought to center section 17a of cylindrical member 17, it is picked up by bucket-type conveyor 22 which carries the material up and deposits it in storage receptacle or hopper 23 which functions as a collector for the material.

Means are also provided to vary the thickness of the layer of material removed. Thus, in the embodiment illustrated, bucket conveyor 22 is pivotally supported on shaft 24 adjacent its upper end and on pin 25 located approximately midway between its ends. Pin 25 is, in turn, connected to pressure cylinder 26 which can cause bucket conveyor 22 to pivot around shaft 24 and thereby raise or lower the lower end of the bucket conveyor with respect to bottom 11. Then, by mounting retaining member 20 and cylinder 17 on the lower end of bucket conveyor 22, these members will move with the bucket conveyor. Thus, the thickness of the layer of material removed can be varied without changing the relative positions of the digging and collecting means. In other words, by pivoting bucket conveyor 22 downwardly, the "bite" which blades 18 and 19 take from the surface of bottom 11 will be increased and conversely by pivoting bucket conveyor upwardly the "bite" will be decreased, yet the lower end of the bucket conveyor will always be in position to pick up the material from the bottom.

Means are provided to transfer, in batches, the material collected in storage, receptacle or hopper 23 from vehicle 10 to the surface of the water. In the embodiment illustrated, traveling container 30 is adapted to slide down guide 31a and 31b and be positioned to receive at least a portion of the material collected in hopper 23. The relative size of hopper 23 and container 30 will depend upon the amount of material being handled and the rapidity with which the container 30 can make the trip to the surface and back. In other words, the rate the material is mined will determine to a large extent the capacity of container 30.

Container 30 is connected through bridle 32 and guide 33 to hoistline 34, which extends to the surface vessel and provides means whereby container 30 is lifted to the surface. Guide 33 is arranged to travel along cable 13, to thereby make sure the container 30 finds its way back to vehicle 10 on the return trip. Guides 31a and 31b are designed to properly position container 30 with respect to hopper 23 regardless of the position of the container with respect to cable 13, when it reaches vehicle 10.

Hoistline 34 can be of any convenient material. Nylon lines are particularly suitable for this purpose since their specific gravity is approximately equal to that of water and, therefore, these lines do not add to the amount of weight which must be lifted to the surface regardless of the amount of line let out. Further, by providing means at the surface to shift the weight of container 30 to another hoist at that point, the strength of hoistline 34 need not be as great as it would otherwise. For example, if the container was of such a size that it would hold approximately 23 tons of material in the air, the material having a density like that found under many areas of the ocean, when in the water, this weight would be reduced, due to the buoyancy of the water, to a little less than 12 tons. Thus, the load on the hoistline would be reduced nearly 50% as long as the hoistline did not have to raise the container out of the water. Therefore, using another hoistline to lift the container out of the water, the strength of hoistline 34 can be greatly reduced, with an attendant reduction in the cost of the line.

Means are also provided to control the loading of container 30. In the embodiment illustrated, a rotary valve, indicated with the number 35, is power operated and located on the underside of hopper 23.

If it is contemplated that a large percent of the material to be mined will comprise clays, sand, etc., which the operator would just as soon not haul all the way to the surface, means can be provided for washing the material in the hopper to remove at least a portion of this undesired constituent before the material is transferred to the surface. In other words, by directing a spray of water against the material as is enters the hopper, generally, the clays, sand, etc., can be dispersed and washed away, leaving only the minerals which are desired. This will be particularly true where nodules are being mined which would have sufficient weight and density to resist being washed away by a moderate stream of water. In this way, the volume of material which must be transferred to the surface during the mining operation is greatly reduced, thereby reducing the overall cost, and increasing the efficiency of the operation.

In order to allow the operation to be observed from the surface, underwater television cameras 36 and 37 can be strategically located to observe the operation of the machine. Additional cameras can be used if necessary. Lights 38 and 39 are arranged to provide light for the television cameras.

As explained above, power is supplied to vehicle 10 through cable 13 to drive tracks 15 and 16 to move the vehicle over the bottom. Also, power is supplied to rotate cylinder 17, conveyor 22, hydraulic piston 26, the television cameras, lights, rotary valve 35, etc. All of this power can be of one type, that is, electrical if desired, or it could be of two types, electrical and hydraulic. If the power is electrical it possibly could come from batteries carried by the vehicle itself, which are periodically recharged.

Much of the apparatus on the machine can be automatically operated. For example, sensing means can be provided to start and stop rotary valve 35 depending upon whether container 30 is in or out of position to receive material from hopper 23. Also the speed at which the vehicle is driven can be automatically controlled by providing a sensor which detects the angle that cable 13 makes with the vehicle and which will slow down or speed up the vehicle to maintain this angle within given limits. Safety means, of course, should also be provided in case the conveying apparatus should encounter an object it cannot handle such as an unusually large nodule of material, etc.

Certain surface controls will be necessary such as the means for starting and stopping the tracks 15 and 16 so that the position and direction of travel of the vehicle can be controlled from the surface. Also the vehicle must be attached to the surface in some way so it can be recovered when necessary for repairs, etc.

In the embodiment illustrated, cable 13 functions to provide power to the vehicle; to tether the vehicle to the surface; and to provide a guide for the means for transferring material to the surface. These functions could just as easily be accomplished by three separate lines, if so desired.

Cable 13 should be kept reasonably taut during the mining operation to keep it from looping, or becoming fouled in the apparatus carried by the vehicle, etc. With the cable taut, however, any vertical movement of the surface vessel, due to waves, will tend to move the vehicle on the bottom a corresponding amount which would interrupt the mining operation. To avoid this, cable 13 should be sufficiently resilient to stretch enough to allow a reasonable amount of vertical movement of the surface vessel without affecting the operation of the bottom vehicle.

In operation then, surface vessel 12 locates vehicle 10 on the bottom of a body of water in position to travel in the desired direction. Energy is transmitted to vehicle 10 and tracks 15 and 16 are caused to move the vehicle over bottom 11. Surface vessel 12 then moves along in the same direction as vehicle 10 at approximately the same speed. The digging means are then lowered into engagement with the bottom to dig away a layer of bottom material. The thickness of this layer will depend upon the particular mining operation being performed. The collecting means are energized so that the material that is dug by the digging means is collected preparatory to being transported to the surface. The digging and collecting operation, of course, goes on continuously as the vehicle travels along the bottom with the transferring means making periodic trips to the surface to empty hopper 23 as required to make room for the constantly entering material from bucket conveyor 22. When the vehicle reaches the end of the strip being mined, it can be turned around and another strip mined in the opposite direction. In this manner, an entire area can be systematically mined, removing a layer of material, then the area can be remined, removing another layer, etc.

From the foregoing, it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for mining the bottom of a body of water, comprising remotely controlled, self-propelled traveling means for moving along the bottom, means carried by the traveling means for digging a layer of solid material from the bottom, collecting means carried by the traveling means to pick up the material and a receptacle movable between a position to receive the material from the collecting means to a position adjacent or above the surface of the water and means for guiding said receptacle into and out of said position to receive said material from the collecting means.

2. Apparatus for mining the bottom of a body of water comprising remotely controlled, self-propelled traveling means for moving along the bottom, means carried by the traveling means for digging a layer of material from the bottom and for moving the material into a windrow, collecting means carried by the traveling means for movement along the windrow to pick up the material, including a traveling receptacle to receive the material from the windrow, and a transporting receptacle movable between a position to receive the material from the storage receptacle to a position adjacent or above the surface of the water.

3. Mining apparatus for use on the bottom of a body of water and adapted to be operated remotely from a point adjacent or above the surface of the water, comprising a remotely controlled, self-propelled vehicle adapted to move along the bottom, means carried by the vehicle to dig up the bottom as the vehicle moves along the bottom, means for collecting the diggings from the bottom including a storage receptacle carried by the vehicle and means for conveying the diggings to the storage receptacle, and means including a flexible line extending from the vehicle to the surface and a movable container slidably attached to the line for movement between a position to receive material from the receptacle to a position above the surface of the water for periodically transferring the diggings from the receptacle to the surface of the water.

4. Apparatus for mining the bottom of a body of water by removing the material forming the top layer of the bottom, comprising a remotely controlled, self-propelled vehicle adapted to move over the bottom, means carried by the vehicle for digging away the material forming the top layer of the bottom and for moving the material laterally to collect the material into a windrow along a line parallel to the direction of travel of the vehicle, means for conveying the material so collected to a receptacle carried by the vehicle, a container movable from a position to receive material from the receptacle to a position adjacent or above the surface of the water, a surface vessel, and flexible means connecting the surface vessel to the vehicle to supply the vehicle with power and to provide a guide for the container as it moves between the vehicle and the surface of the water.

5. Apparatus for mining the bottom of a body of water, comprising a vehicle including motor means carried by the vehicle for moving the vehicle along the bottom and a flexible power cable extending from the vehicle to the surface through which power is supplied to the motor means, a screw conveyor carried by the vehicle, having helically shaped blades adapted to engage the bottom and dig away the material of the top layer and move the material laterally of the direction of travel of the vehicle to form the material into a windrow along a line parallel to the direction of travel of the vehicle, a hopper carried by the vehicle, conveyor means carried by the vehicle and located to pick up the material from the windrow and deposit it in the hopper, and a movable container, movable from a position to receive material from the hopper to a position adjacent or above the surface of the water to transfer the material to the surface.

References Cited by the Examiner

UNITED STATES PATENTS

| | | | |
|---|---|---|---|
| 104,594 | 1/1870 | Howard | 37—69 |
| 872,888 | 12/1907 | Becchi et al. | 61—69 |
| 967,741 | 8/1910 | Eastman | 37—71 X |
| 2,169,518 | 8/1939 | Brady et al. | 37—69 X |
| 2,636,288 | 4/1953 | Thomas | 37—69 X |
| 3,010,232 | 11/1961 | Skakel et al. | 37—195 |
| 3,030,080 | 4/1962 | Hise et al. | 37—54 X |
| 3,143,816 | 8/1964 | Gardner | 37—71 |

FOREIGN PATENTS

| | | |
|---|---|---|
| 450,255 | 7/1949 | Italy. |
| 125,763 | 2/1960 | U.S.S.R. |

ABRAHAM G. STONE, *Primary Examiner.*

J. R. OAKS, *Assistant Examiner.*